No. 714,263. Patented Nov. 25, 1902.
C. A. TROTTER.
RANGE FINDER.
(Application filed Aug. 12, 1902.)
(No Model.) 2 Sheets—Sheet 1.
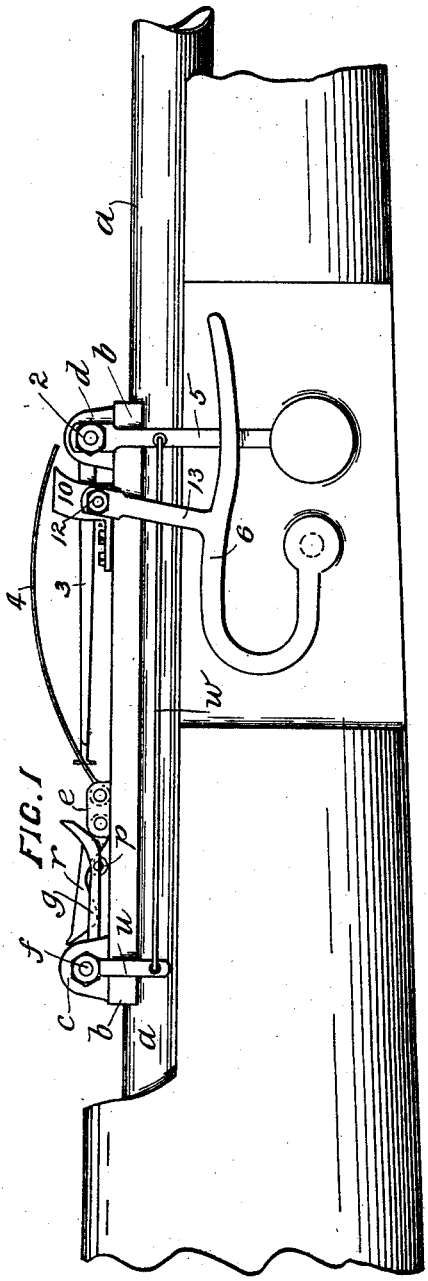
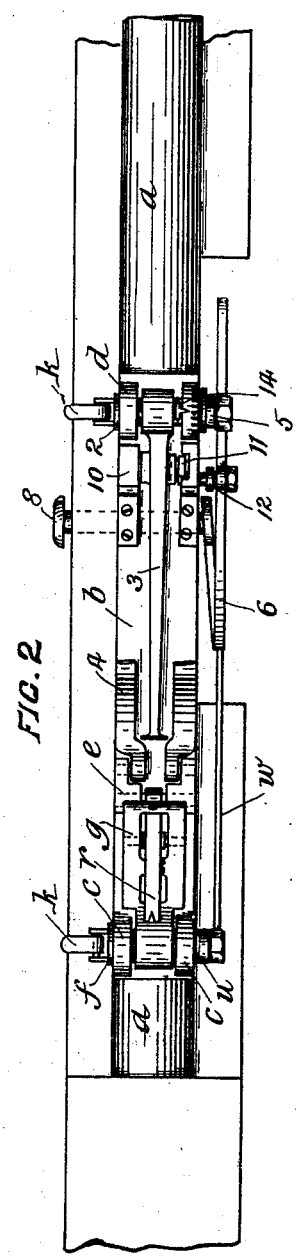
WITNESSES:
INVENTOR.
Charles Alister Trotter
BY
ATTORNEYS.

No. 714,263. Patented Nov. 25, 1902.
C. A. TROTTER.
RANGE FINDER.
(Application filed Aug. 12, 1902.)
(No Model.) 2 Sheets—Sheet 2.
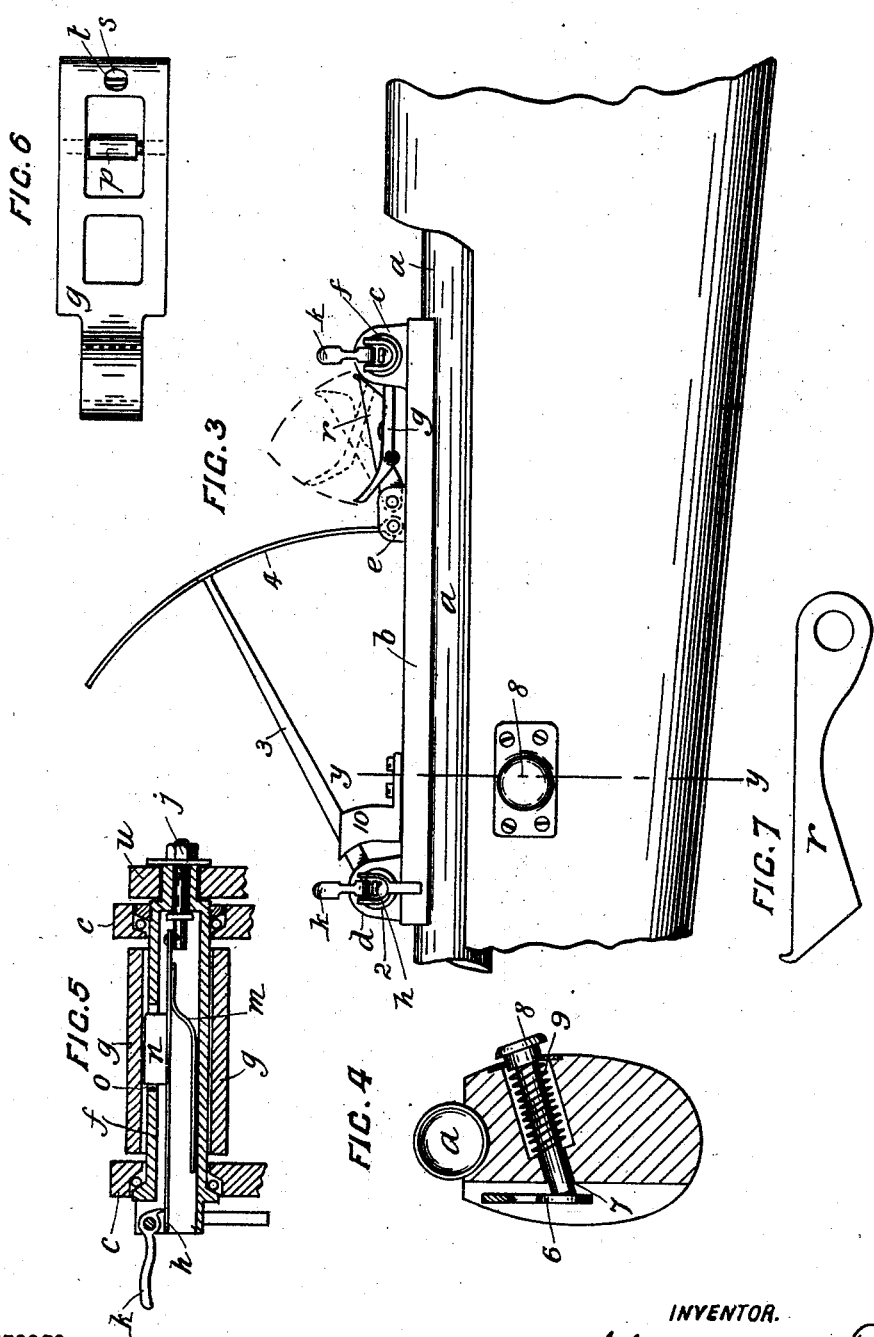
WITNESSES:
INVENTOR.
Charles Alister Trotter
BY
ATTORNEYS

UNITED STATES PATENT OFFICE.

CHARLES ALISTER TROTTER, OF APUNAKE, NEW ZEALAND.

RANGE-FINDER.

SPECIFICATION forming part of Letters Patent No. 714,263, dated November 25, 1902.

Application filed August 12, 1902. Serial No. 119,438. (No model.)

*To all whom it may concern:*

Be it known that I, CHARLES ALISTER TROTTER, a subject of the King of Great Britain, residing at Apunake, in the Colony of New Zealand, have invented new and useful Improvements in Range-Finders; and I do hereby declare the following to be a full, clear, and exact description of the same.

This invention has been devised for the purpose of providing means whereby the distances of objects from any one point may be automatically gaged or the altitude of any objects from the level obtained. The appliances employed are more particularly applicable to range-finding for rifle-shooting, and in describing the invention it will be described as applied to a rifle, although it will be readily understood that it may be adapted to suit other purposes. When applied to a rifle, in addition to ascertaining the range or distances of objects the appliances will also automatically indicate the amount of elevation required for firing at the relative distances of such objects.

In order that the invention may be properly understood, reference will be made to the accompanying sheets of drawings, in which—

Figure 1 is a side elevation of portion of a rifle with the appliances shown in position thereon. Fig. 2 is a plan of the same. Fig. 3 is a side elevation looking from the opposite side to Fig. 1. Fig. 4 is a part cross-section taken on the line $y y$ of Fig. 3. Figs. 5, 6, and 7 are detail views, on an enlarged scale, of parts that will be hereinafter referred to.

To the top of the barrel $a$ of the rifle is fastened a metal plate $b$, provided with bearings $c$ at the back end and with bearings $d$ at the fore end thereof and also with bearings $e$ between the bearings $c$ and $d$. Within the bearings $c$ is mounted a pin $f$, that is free to revolve in such bearings, and upon such pin is loosely pivoted the lever-arm $g$. (Shown in enlarged detail in Fig. 6.) The pin $f$ is made hollow and is provided with means whereby it may be caused to grip the inside of the bearing of the arm $g$, so as to cause it to rotate with it, or may free such bearing, so that the arm and pin may move independently of each other. These means are shown in detail in Fig. 5 and consist of a flat rod $h$, inserted in the pin and secured at one end to the inside end of a small bolt $j$, by means of which the pin $f$ is secured within the bearings $c$. The other end of the rod $h$ projects slightly out of the end of the pin. Secured in suitable bearings upon this end of the pin is a pivoted finger-cam $k$, that bears upon the top of the rod $h$, so that as the cam is moved up or down it will depress or allow the rod $h$ to rise. A spring $m$ bears upon the under side of this rod and tends to always keep it in the raised position. Secured to the top face of the rod $h$ is a vertical knife-edge $n$, that projects upward through a slot $o$, made in the pin, so as to engage with the inside surface of the bearing of the lever $g$ and lock it to the spindle when the rod is up and to free such surface when the rod is depressed by raising the finger-cam $k$.

The lever-arm $g$ is provided with a small antifriction-roller $p$, upon which rests the curved bottom of a cam-arm $r$, that is pivoted in the bearing $e$ of the metal plate $b$. This arm is shown in detail in Fig. 7 and is formed on its outward extremity with a V-shaped notch. The outward extremity of the arm $g$ is also formed with a small aperture $s$ therein, and this aperture is divided centrally by means of the fine cross-bar $t$. The cam-arm $r$, resting upon the roller $p$ of the lever $g$, will be caused to rise on its pivot as the lever $g$ is raised on its pivot and through the same radial distance.

Within the bearings $d$ is mounted a pin 2, similar in construction and provided with similar attachments to those of the pin $f$ already described and shown in Fig. 5 of the drawings. Upon this pin is pivoted a sighting lever-arm 3, the outward extremity of which is adapted to move up and down in a central slot formed in an arc-shaped plate 4, hinged to the bearings $e$, when such plate is raised to the vertical position. (Shown in Fig. 3.) By operating the cam-finger $k$ of this pin it will lock the arm 3 thereto, so as to rotate with it, or free the arm, so that both the arm and the pin shall be free to move independently of each other as desired.

Upon the end of pin 2 is rigidly attached a pendent weighted arm 5, that is arranged so as to be free to swing alongside the barrel $a$. A pendent arm $u$ is also attached to the end of the pin $f$, and these two arms are connected together by means of the rigid connecting-rod $w$, so that any turning motion on the pin 2 will be communicated to the pin $f$.

A flat plate 6 bears against the outside face of the pendent arm 5 and keeps it normally from moving. Connected to this plate is a spindle 7, Fig. 4, that passes through the stock of the rifle and is provided on the opposite end with a thumb-piece 8. This spindle is surrounded by a helical spring 9, whose tendency is to press the thumb-piece outward, so as to cause the plate 6 to bear against the arm 5. By pressing the thumb-piece 8 inward the plate 6 will be freed from contact with the pendent arm 5.

Secured to the top of the plate $b$ and upon each side of the sighting-lever 3 are guide-pieces 10, that serve as guides for the lever 3 as it rises or falls on its pivot. The lever at this point is provided with widening pieces, made so as to slide within the guide-pieces 10. The guide-piece 10 on one side has fitting within it a vertical bar 11, the outside face of which is serrated and presses against the widening piece of the arm 3. This bar is connected to the plate 6 by means of the short pin 12 and connecting-piece 13, so that as such plate 6 is drawn inward by the tension of the spring 9 the bar 11 will also be caused to press against the lever 3, so as to prevent it from moving, but which will be caused to free the lever when the thumb-piece 8 is pressed in.

The manner of operating the appliances is as follows: The marksman using the rifle will first train onto the object to be fired at with fixed sights, which in this case are the ordinary fore sight and the top edge of the extremity of the lever-arm $g$ acting as rear sight. This will give him the axis of the piece, or, in other words, the point of intersection of the base-plane with the vertical plane of the movement of the rifle. The cam-finger $k$ of the spindle $f$ will then be lowered, so as to cause the spindle to be locked to the lever $g$. The thumb-piece 8 is pressed inward by the thumb, so as to free the pendent arm 5, and the spindle 2 is revolved by turning the bearing of the finger-cam $k$ with the point of the thumb. This will have the effect of causing the lever $g$ to rise on its pivot and carry with it the lever $r$, as shown by dotted lines in Fig. 3. This rising motion will be continued until the target is brought into line with the eye of the marksman through the aperture in the arm $g$ and the bottom of the V-notch in the cam-arm $r$. The pressure on the thumb-piece 8 is then removed, when the plate 6 will spring in and hold the weighted pendent arm 5 the amount out of the vertical through which it has been moved in order to raise the arms $g$ and $r$ through the necessary distance. The arm $g$ is then unlocked from its spindle by raising its finger-cam $k$ so that the arms will fall back or be forced back by means of a small spring surrounding the axis of the cam-arm $r$ into their normal positions. After this has been done the spindle 2 is locked to the sighting-lever 3 by its finger-cam $k$ and the pressure again applied to the thumb-piece 8, so as to free the pendent arm 5, when its weight will immediately cause it to swing around to the vertical position, thus turning the spindle and the sighting-lever 3 through a corresponding distance. The outward end of the sighting-lever will thus rise in the slot of the arc-plate 4, which has previously been raised to the vertical position. (Shown in Fig. 3.) The end of this lever will then serve the purpose of the tangent-sight, as in ordinary rifles. This sight and the ordinary fore sight are then brought into alinement with the target, and the proper elevation of the rifle for the corresponding distance is obtained. By releasing the pressure upon the thumb-piece the plate 6 will spring in and engage with the pendent arm 5, while at the same time the serrated surface of the bar 11 will engage with the sighting-lever and hold it firmly in the raised position, so that the sight becomes fixed for firing any number of shots. By pressing upon the thumb-piece and unlocking the spindle 2 from the lever 3 the parts will return to their normal positions.

The arc-plate 4 is provided on each side with markings at distances apart thereon to be determined by experiment for each class of rifle to which the appliances are attached. These markings are respectively made to coincide with the heights to which the sighting-lever 3 is moved when sighted at objects known distances away. The markings will thus serve to indicate the distances of objects that are previously unknown by using the appliances in the manner hereinbefore described.

When using the appliances either for calculating the vertical height or depth of an object from a given point, a pointer 14, Fig. 2, will be attached to the spindle 2, so as to move with it as it rocks in its bearings. The top face of one of the bearings $d$ is marked with markings corresponding to degrees in an angle through which the spindle is turned when the rifle is raised or depressed to aim at an object up or down hill. The amount of such movement is then noted, and the actual distance at which the object is is indicated in the manner before described. A right-angled triangle is thus obtained, in which the length of the base and two of the angles are given, so that the vertical side or the amount of altitude or depression desired may be readily calculated.

Having now particularly described and ascertained the nature of my said invention and in what manner the same is to be performed, I declare that what I claim is—

1. In means for ascertaining distances, a lever-arm pivoted upon a spindle that is mounted in bearings at the back end of a horizontal base-plate and that is formed with an aperture in the outer extremity thereof, in combination with a cam-arm, pivoted in bearings upon the base-plate with its free end overlying the free end of the lever-arm so that, when such lever-arm is raised on its pivot, the cam-arm will be raised a corresponding radial distance on its pivot, such cam-arm being formed, on its outer extremity, with a notch in the same line as the aperture in the lever-arm, and means whereby the arms may be raised and locked in any position, as herein specified.

2. A lever-arm loosely pivoted upon a spindle, mounted in bearings upon the back end of a horizontal base-plate, that is provided with means whereby the lever may be locked thereto, in combination with a spindle loosely mounted in bearings upon the other end of the base-plate and provided with a pendent weighted arm, a rigid rod connecting the weighted arm with a pendent arm upon the back spindle, and means whereby the weighted arm may be turned with its spindle and locked in any position, as herein specified.

3. A spindle mounted in bearings upon the front end of a horizontal base-plate and provided with a pendent weighted arm secured thereto, a sighting lever-arm loosely pivoted thereon, and means whereby the arm may be locked to the spindle, in combination with an arced plate that is hinged to the base-plate and is provided with a central slot in which the outer extremity of the sighting-lever will travel, when the plate is raised, and with means whereby the sighting-lever and weighted arm may be held in any position, as herein specified.

4. A lever-arm loosely pivoted upon a spindle mounted in bearings upon the back end of a horizontal base-plate, means whereby such arm may be locked to the spindle, a cam-arm hinged to the base-plate with its free end overlying the free end of the lever-arm so as to be raised when such lever-arm is turned by its spindle, in combination with a sighting-lever loosely pivoted upon a spindle mounted in bearings upon the fore end of the base-plate, means for locking the sighting-lever to its spindle, a weighted pendent arm attached to the spindle, a rigid rod connecting the weighted arm to a pendent arm on the back spindle, and means whereby the fore spindle may be turned, and locked in any position, as specified.

5. A spindle mounted in bearings upon the fore end of a horizontal base-plate and provided with a weighted pendent arm secured to the end thereof, and a plate engaging with the surface of such pendent arm and kept in contact therewith by means of a spring surrounding a pin secured at one end to the plate and provided with a thumb-piece upon the other end, as set forth.

6. A spindle mounted in bearings upon the fore end of a horizontal base-plate and provided with a weighted pendent arm secured to the end thereof, a sighting lever-arm loosely pivoted upon the spindle, means whereby it may be locked thereto, radial guides for the sighting-lever fixed to the base-plate, and a vertical bar fitting within the inside surface of one of the guides and engaging with the side of the lever, such vertical bar being connected to a spring-controlled pin whereby it will be kept in contact with the lever and may be freed therefrom, as specified.

7. A hollow spindle mounted in bearings upon the back end of a horizontal base-plate, with a lever-arm loosely pivoted thereon, and a hollow spindle mounted in bearings upon the fore end of the base-plate, with a sighting-lever loosely pivoted thereon, a flat bar secured within the hollow of each of such spindles, a spring bearing upon the under side of the bar, a finger-cam hinged in bearings at the end of the spindle and bearing upon the end of the bar so as to depress or allow it to rise, and a knife-edged plate secured to the top of the bar and projecting through a slot in the spindle so that it shall engage with and free the inside surface of the bearing of the lever upon the spindle when the cam-finger is depressed and raised, as set forth.

8. In means for ascertaining distances and calculating altitudes, a spindle mounted in bearings upon the fore end of a horizontal base-plate, a sighting-lever loosely pivoted upon such spindle and adapted to be locked thereto, an arced slot in which the end of such lever travels, a weighted pendent arm attached to the spindle, means for locking such arm in any position, and an indicator-pointer attached to the spindle and moving over a graduated scale as the spindle is revolved through the inclination of the base-plate, as herein specified.

In testimony whereof I have signed this specification in the presence of two subscribing witnesses.

CHARLES ALISTER TROTTER.

Witnesses:
C. BROOKE-SMITH,
W. A. STYAK.